(12) United States Patent
Hill et al.

(10) Patent No.: US 7,974,505 B2
(45) Date of Patent: Jul. 5, 2011

(54) METHOD FOR FABRICATING SELECTIVELY COUPLED OPTICAL WAVEGUIDES ON A SUBSTRATE

(75) Inventors: Craig M. Hill, Warrenton, VA (US); Mark Jaso, Fairfax Station, VA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 261 days.

(21) Appl. No.: 12/517,619

(22) PCT Filed: Aug. 29, 2008

(86) PCT No.: PCT/US2008/074786
§ 371 (c)(1),
(2), (4) Date: Jun. 4, 2009

(87) PCT Pub. No.: WO2009/051902
PCT Pub. Date: Apr. 23, 2009

(65) Prior Publication Data
US 2010/0014804 A1    Jan. 21, 2010

Related U.S. Application Data

(60) Provisional application No. 60/999,235, filed on Oct. 17, 2007.

(51) Int. Cl.
*G02B 6/12* (2006.01)
*G02B 6/26* (2006.01)
*B29D 11/00* (2006.01)
*H01L 21/00* (2006.01)

(52) U.S. Cl. ........... 385/14; 385/50; 385/131; 385/130; 385/132; 438/31; 216/24

(58) Field of Classification Search .............. 385/14, 385/39, 42, 50, 120, 130, 131, 132, 141; 438/29, 31, 64, 65, 66, 74; 65/385, 386, 406; 216/24
See application file for complete search history.

(56) References Cited

U.S. PATENT DOCUMENTS
4,048,591 A    9/1977  Auracher ............... 385/14 X
(Continued)

FOREIGN PATENT DOCUMENTS
EP    08 818 693    1/1998
(Continued)

OTHER PUBLICATIONS

Pruessner, et al, "InP-Based Optical Waveguide MEMS Switches With Evanescent Coupling Mechanism", 2005 IEEE, Journal of Microelectromechanical Systems, vol. 14, No. 5, Oct. 2005.

(Continued)

*Primary Examiner* — Brian M Healy
(74) *Attorney, Agent, or Firm* — Dillon & Yudell LLP; Antony Ng; Daniel J. Long

(57) ABSTRACT

A method for fabricating selectively coupled optical waveguides on a substrate is disclosed. Initially, a first layer of waveguide material is deposited on a substrate. The first layer of waveguide material is then etched to form multiple level one waveguides and fill shapes. A dielectric layer is deposited on top of the level one waveguides and fill shapes. The surface profile of the dielectric layer deposition tracks the pattern density of the fill shapes. After the surface of the dielectric layer has been polished, a second layer of waveguide material is deposited on the substrate. At least one optically coupled waveguide structure, which is formed by a first level one waveguide and a first level two waveguide, is located adjacent to at least one non-optically coupled waveguide structure, which is formed by a second level one waveguide and a second level two waveguide.

6 Claims, 2 Drawing Sheets

U.S. PATENT DOCUMENTS

| | | | | |
|---|---|---|---|---|
| 4,420,258 | A | 12/1983 | Burns et al. | 356/350 |
| 4,547,072 | A | 10/1985 | Yoshida et al. | 356/350 |
| 4,748,617 | A | 5/1988 | Drewlo | 370/446 |
| 4,921,354 | A | 5/1990 | SooHoo | 356/350 |
| 5,165,001 | A | 11/1992 | Takagi et al. | 385/42 |
| 5,281,805 | A | 1/1994 | Sauer | 250/214 R |
| 5,371,591 | A | 12/1994 | Martin et al. | 341/155 |
| 5,430,755 | A | 7/1995 | Perlmutter | 372/94 |
| 5,625,636 | A | 4/1997 | Bryan et al. | 372/50 |
| 5,674,778 | A | 10/1997 | Lee et al. | 437/126 |
| 5,703,989 | A | 12/1997 | Khan et al. | 385/130 |
| 5,736,461 | A | 4/1998 | Berti et al. | 438/651 |
| 5,828,476 | A | 10/1998 | Bonebright et al. | 359/152 |
| 5,834,800 | A | 11/1998 | Jalali-Farahani et al. | 257/198 |
| 6,117,771 | A | 9/2000 | Murphy et al. | 438/679 |
| 6,242,324 | B1 | 6/2001 | Kub et al. | 438/455 |
| 6,331,445 | B1 | 12/2001 | Janz et al. | 438/57 |
| 6,387,720 | B1 | 5/2002 | Misheloff et al. | 438/31 |
| 6,400,996 | B1 | 6/2002 | Hoffberg et al. | 700/83 |
| 6,434,303 | B1 | 8/2002 | Temkin et al. | 385/43 |
| 6,477,285 | B1 | 11/2002 | Shanley | 385/14 |
| 6,596,185 | B2 * | 7/2003 | Lin et al. | 216/24 |
| 6,605,809 | B1 | 8/2003 | Engels et al. | 250/394 |
| 6,677,655 | B2 | 1/2004 | Fitzergald | 257/432 |
| 6,680,495 | B2 | 1/2004 | Fitzergald | 257/183 |
| 6,717,060 | B2 * | 4/2004 | Kragl et al. | 174/255 |
| 6,738,546 | B2 | 5/2004 | Deliwala | 385/50 |
| 6,785,447 | B2 | 8/2004 | Yoshimura et al. | 385/42 |
| 6,795,622 | B2 | 9/2004 | Forrest et al. | 385/50 |
| 6,850,252 | B1 | 2/2005 | Hoffberg | 345/716 |
| 6,861,369 | B1 | 3/2005 | Park | 438/745 |
| 6,936,839 | B2 | 8/2005 | Taylor | 257/20 |
| 6,968,110 | B2 | 11/2005 | Patel et al. | 385/131 |
| 7,006,881 | B1 | 2/2006 | Hoffberg et al. | 700/83 |
| 7,010,208 | B1 | 3/2006 | Gunn, III et al. | 385/131 |
| 7,043,106 | B2 | 5/2006 | West et al. | 385/14 |
| 7,072,556 | B1 | 7/2006 | Gunn, III et al. | 385/129 |
| 7,082,247 | B1 | 7/2006 | Gunn, III et al. | 385/129 |
| 7,103,252 | B2 | 9/2006 | Ide | 385/131 |
| 7,139,448 | B2 | 11/2006 | Jain et al. | 385/14 |
| 7,215,845 | B1 | 5/2007 | Chan et al. | 365/24 |
| 7,218,809 | B2 | 5/2007 | Zhou et al. | 385/28 |
| 7,218,826 | B1 | 5/2007 | Gunn, III et al. | 385/131 |
| 7,259,031 | B1 | 8/2007 | Dickinson et al. | 438/23 |
| 7,272,279 | B2 | 9/2007 | Ishikawa et al. | 385/43 |
| 7,315,679 | B2 | 1/2008 | Hochberg et al. | 385/129 |
| 7,333,679 | B2 | 2/2008 | Takahashi | 385/1 |
| 7,348,230 | B2 | 3/2008 | Matsuo et al. | 438/197 |
| 7,356,221 | B2 | 4/2008 | Chu et al. | 385/30 |
| 2003/0026546 | A1 | 2/2003 | Deliwala | 385/40 |
| 2003/0151790 | A1 | 8/2003 | Romanovsky | 359/245 |
| 2003/0183825 | A1 | 10/2003 | Morse | 257/79 |
| 2004/0146431 | A1 | 7/2004 | Scherer et al. | 422/82.05 |
| 2004/0190274 | A1 | 9/2004 | Saito et al. | 361/783 |
| 2005/0094938 | A1 | 5/2005 | Ghiron et al. | 385/36 |
| 2005/0152649 | A1 | 7/2005 | Benisty et al. | 385/50 |
| 2006/0105509 | A1 | 5/2006 | Zia et al. | 438/154 |
| 2006/0158723 | A1 | 7/2006 | Voigt et al. | 359/430 |
| 2006/0238866 | A1 | 10/2006 | Von Lerber | 359/487 |
| 2006/0240667 | A1 | 10/2006 | Matsuda et al. | 438/655 |
| 2007/0116398 | A1 | 5/2007 | Pan et al. | 385/2 |
| 2007/0202254 | A1 | 8/2007 | Ganguli et al. | 427/252 |
| 2008/0052904 | A1 * | 3/2008 | Schneider et al. | 29/846 |
| 2008/0159751 | A1 | 7/2008 | Matsui et al. | 398/183 |
| 2008/0240180 | A1 | 10/2008 | Matsui et al. | 372/26 |
| 2010/0014804 | A1 * | 1/2010 | Hill et al. | 385/14 |

FOREIGN PATENT DOCUMENTS

| | | |
|---|---|---|
| EP | 1 067 409 | 1/2001 |
| WO | 9314514 | 7/1993 |
| WO | 0127669 | 4/2001 |
| WO | WO 02/16986 A1 | 2/2002 |
| WO | 2004088724 | 10/2004 |
| WO | 2007149055 | 12/2007 |

OTHER PUBLICATIONS

Kik et al, "Erbium Doped Optical Waveguide Amplifiers on Silicon", MRS Bulletin 23(4), 48, Apr. 1998.

May et al., "Integrated Process for Silicon Nitride Waveguide Fabrication", IBM Technical Disclosure Bulletin, vol. 33, No, 2, Jul. 1990.

Matsushita et al., "Narrow CoSi2 Line Formation on SiO2 by Focused Ion Beam", IEEE Xplore 1999.

Liu et al., "Design of Monolithically Integrated GeSi Electro-absorption Modulators and Photodetectors on an SOI Platform", Optics Express 623, vol. 15, No. 2, Jan. 22, 2007.

Yap et al., "Integrated Optoelectronic Circuits with InP-based HBTs", Proceedings of SPIE, vol. 4290, 2001.

Roth, "Electroabsorption Modulators for CMOS Compatible Optical Interconnects in III-V and Group IV Materials", Aug. 2007, (part 1 of 3).

Roth, "Electroabsorption Modulators for CMOS Compatible Optical Interconnects in III-V and Group IV Materials", Aug. 2007, (part 2 of 3).

Roth, "Electroabsorption Modulators for CMOS Compatible Optical Interconnects in III-V and Group IV Materials", Aug. 2007, (part 3 of 3).

Chao et al., "Analysis of Temperature Profiles of Thermo-optic Waveguides", Fiber and Integrated Optics, vol. 33, Apr. 1994.

Okyay et al., "Silicon Germanium CMOS Optoelectronic Switching Device: Bringing Light to Latch", IEEE Transactions on Electron Devices, vol. 54. No. 12, Dec. 2007.

Mcaulay et al., "All-optical Switching and Logic with an Integrated Optic Microring Resonator", Proc. of SPIE vol. 5814, Pro of SPIE 2005.

Kimmet, J. S., "M.S. Thesis: Integrated Circuit Fabrication Details," Rutgers University, 1999; 18 pp.

* cited by examiner

METHOD FOR FABRICATING SELECTIVELY COUPLED OPTICAL WAVEGUIDES ON A SUBSTRATE

PRIORITY CLAIM

The present application claims benefit of priority under 35 U.S.C. §365 to the previously filed international patent application number PCT/US08/074786 filed on Aug. 29, 2008, assigned to the assignee of the present application, and having a priority date of Oct. 17, 2007, based upon U.S. provisional patent application No. 60/999,235, the contents of both applications are incorporated herein by reference.

STATEMENT OF GOVERNMENT INTEREST

The invention claimed in this patent application was made with U.S. Government support under contract No. HR0011-05-C-0027 awarded by the Defense Advanced Research Projects Agency (DARPA). The U.S. Government has certain rights in the invention.

BACKGROUND OF THE INVENTION

1. Technical Field

The present invention relates to optical waveguides in general, and in particular to a method for fabricating selectively coupled optical waveguides on a substrate.

2. Description of Related Art

Although optical waveguides can be fabricated in different layers of a substrate in a stack structure, the difficulties in enabling all those optical waveguides to couple with one another can limit the usefulness of the stacked structure. In order for optical waveguides located in different layers to couple with each other, the vertical distance between them must be a fraction of the optical wavelength, and this distance is much smaller than the typical dielectric thickness required to isolate two layers.

The entire length of conventionally coupled waveguides are separated by a relatively thin dielectric layer having a uniform thickness. However, the usage of one uniform dielectric thickness across the substrate as the coupling layer does not allow for optically isolating the optical waveguides. Thus, the conventional method of utilizing a thin coupling layer limits the integration density of coupled waveguides due to the relatively large separation distances required to provide optical isolation from adjacent waveguides.

Consequently, it would be desirable to provide an improved method for fabricating coupled optical waveguides such that optical coupling can be achieved within localized areas while adequate optical isolation from other waveguide structures located in close proximity can also be attained.

SUMMARY OF THE INVENTION

In accordance with a preferred embodiment of the present invention, a first layer of waveguide material is initially deposited on a substrate. The first layer of waveguide material is then etched to form multiple level one waveguides and fill shapes. A dielectric layer is deposited on top of the level one waveguides and fill shapes. The surface profile of the dielectric layer deposition tracks the pattern density of the fill shapes. After the surface of the dielectric layer has been polished, a second layer of waveguide material is deposited on the substrate. At least one optically coupled waveguide structure, which is formed by a first level one waveguide and a first level two waveguide, is located adjacent to at least one non-optically coupled waveguide structure, which is formed by a second level one waveguide and a second level two waveguide.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
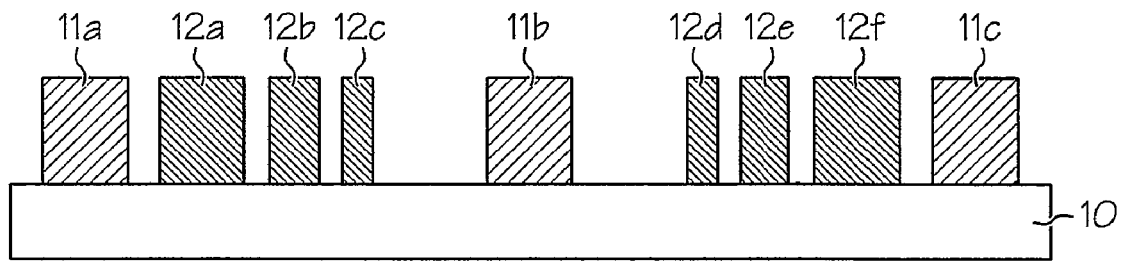
FIGS. 1-4 are drawings illustrating sequential steps of a method for fabricating selectively coupled optical waveguides, in accordance with a preferred embodiment of the present invention.

Referring now to the drawings and in particular to FIGS. 1-4, there are illustrated sequential steps of a method for fabricating selectively coupled optical waveguides, in accordance with a preferred embodiment of the present invention. Initially, a layer of waveguide material is deposited on a substrate 10. The waveguide material layer is then etched using conventional lithographic methods to form level one waveguides 11a-11c and fill shapes 12a-12f, as shown in FIG. 1. Since waveguides 11a-11c and fill shapes 12a-12f are made of the same waveguide material, they are essentially identical from each other (even though they are shown in different colors), except waveguides 11a-11c will actually be utilized to perform the functions of waveguides while fill shapes 12a-12f will only be served as spacers or fillers.

Figure 2:
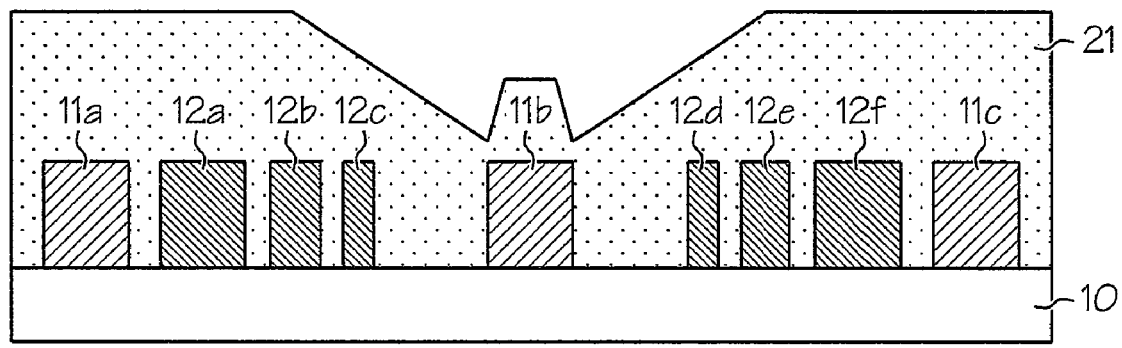

Next, a dielectric layer 21, such as silicon oxide, silicon dioxide or cladding material, is deposited over substrate 10, covering waveguides 11a-11c and fill shapes 12a-12f, as depicted in FIG. 2. The deposition surface profile of dielectric layer 21 is determined by the pattern density of fill shapes 12a-12f. The pattern density of fill shapes 12a-12f is defined by the individual size of fill shapes 12a-12f, the distances between fill shapes 12a-12f, and the distances between fill shapes 12a-12f and waveguides 11a-11c.

For example, in FIG. 2, the deposition surface profile of dielectric layer 21 directly above waveguide 11a and fill shapes 12a-12b is relatively flat because of the larger sizes of waveguide 11a and fill shapes 12a-12b as well as the close proximity among waveguide 11a and fill shapes 12a-12b. The deposition surface profile of dielectric layer 21 gradually slopes down from fill shape 12b to waveguide 11b because of the relatively smaller size of fill shape 12c and the relatively longer distance between fill shape 12c and waveguide 11b. Similarly, the deposition surface profile of dielectric layer 21 directly above waveguide 11c and fill shapes 12e-12f is relatively flat because of the larger sizes of waveguide 11c and fill shapes 12e-12f as well as the close proximity among waveguide 11c and fill shapes 12e-12f. The deposition surface profile of dielectric layer 21 gradually slopes down from fill shape 12d to waveguide 11b because of the relatively smaller size of fill shape 12d and the relatively longer distance between fill shape 12d and waveguide 11b.

Figure 3:
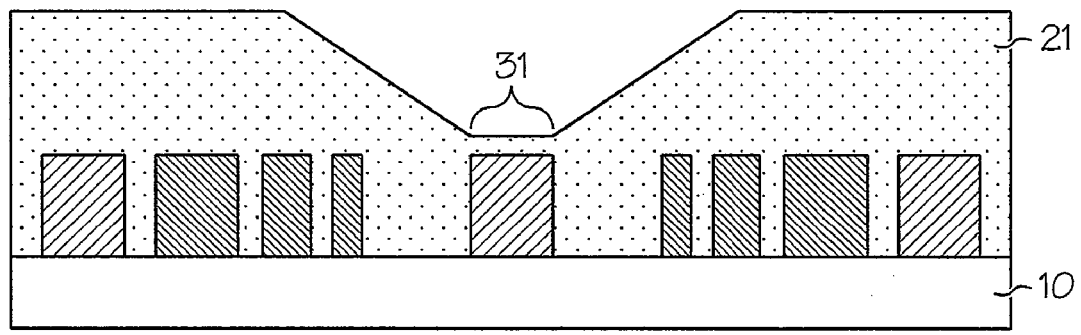

A chemical mechanical polishing (CMP) process is subsequently utilized to shave or thin out an area 31 of dielectric layer 21 located directly above waveguide 11b, as shown in FIG. 3. The exact removal amount of dielectric layer 21 is determined by the pattern density of fill shapes 12a-12f and the CMP process.

Figure 4:
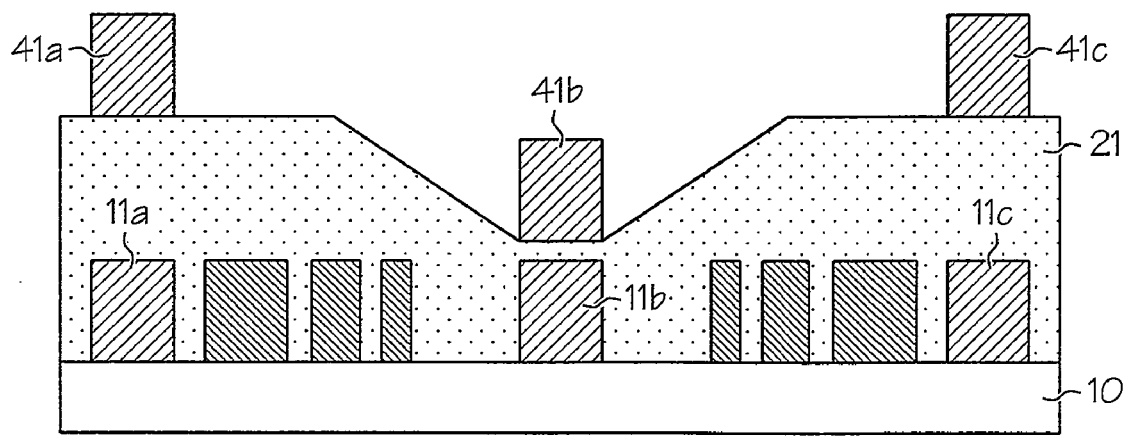

A second waveguide material layer is deposited over dielectric layer 21. The second waveguide material layer is then patterned using conventional lithography method to produce level two waveguides 11a-11c, as depicted in FIG. 4. In the present example, area 31 (from FIG. 3) of dielectric layer 21 is thin enough to allow waveguide 41b to be optically coupled to waveguide 11b, but the other areas of dielectric layer 21 are much thicker such that waveguides 41a, 41c are not optically coupled to waveguides 11a, 11c. In addition, adequate optical isolation are maintained between optically coupled waveguides 11b, 41b and other waveguides 11a, 11c, 41a and 41c located in close proximity to optically coupled waveguides 11b, 41b.

Figure 2A:
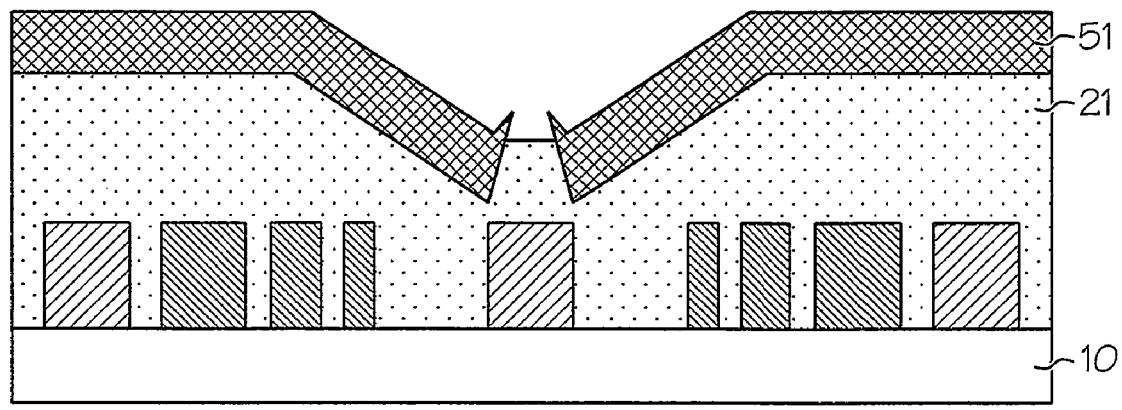
FIGS. 2a-2b are drawings illustrating the optional steps for decreasing the polishing load in certain area of the dielectric layer in FIG. 2.
Figure 2B:
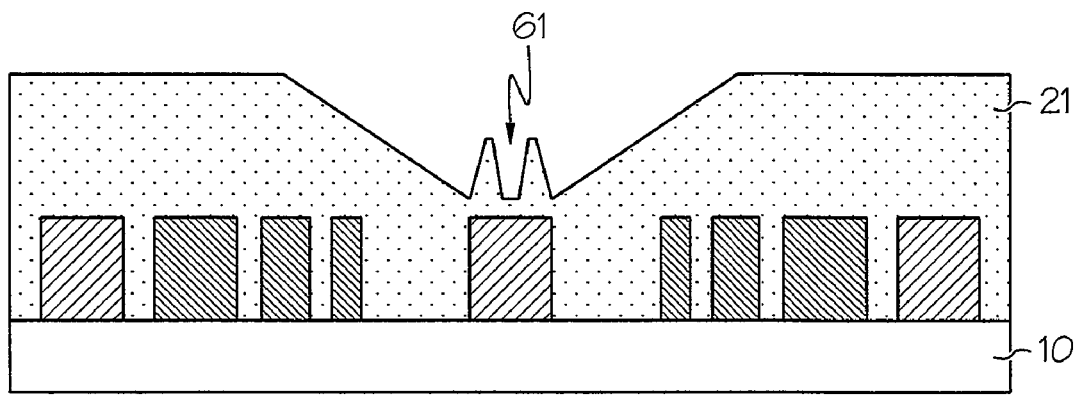

With reference now to FIGS. 2a-2b, there are illustrated the optional steps for decreasing the polishing load at the area of dielectric layer 21 located directly over waveguide 11b in FIG. 2. First, dielectric layer 21 is etched using a photo resist layer 51 placed on dielectric layer 21, as shown in FIG. 2a. Photo resist layer 51 is then stripped leaving a via 61 in dielectric layer 21 for waveguide deposition, as depicted in FIG. 2b. The optional steps are to be performed after FIG. 2 and before FIG. 3.

As has been described, the present invention provides an improved method for fabricating selectively coupled optical waveguides such that optical coupling can be achieved within localized areas while adequate optical isolation from other waveguide structures located in close proximity can also be attained.

While the invention has been particularly shown and described with reference to a preferred embodiment, it will be understood by those skilled in the art that various changes in form and detail may be made therein without departing from the spirit and scope of the invention.

What is claimed is:

1. A method for fabricating selectively coupled optical waveguides on a substrate, said method comprising:
    depositing a first layer of waveguide material on a substrate;
    etching said first layer of waveguide material to form a plurality of level one waveguides and fill shapes;
    depositing a dielectric layer on top of said level one waveguides and fill shapes, wherein the deposition surface profile of said dielectric layer tracks the pattern density of said fill shapes;
    polishing the surface of said dielectric layer;
    depositing a second layer of waveguide material on said substrate; and
    etching said second layer of waveguide material to form a plurality of level two waveguides, wherein at least one optically coupled waveguide structure is formed by a first one of said level one waveguides and a first one of said level two waveguides, and at least one non-optically coupled waveguide structure is formed by a second one of said level one waveguides and a second one of said level two waveguides, wherein said at least one optically coupled waveguide structure is located adjacent to said at least one non-optically coupled waveguide structure.

2. The method of claim 1, wherein said optically coupled waveguide structure is optically isolated from said non-optically coupled waveguide structure.

3. The method of claim 1, wherein said depositing further includes
    etching said dielectric layer utilizing a photo resist layer; and
    stripping said photo resist layer to leave a via in said dielectric layer for waveguide deposition.

4. A semiconductor structure comprising:
    a substrate;
    a plurality of fill shapes;
    a plurality of level one waveguides separated by said plurality of fill shapes, wherein said plurality of fill shapes and level one waveguides are situated within a dielectric layer located on said substrate; and
    a plurality of level two waveguides, wherein at least one optically coupled waveguide structure is formed by a first one of said level one waveguides and a first one of said level two waveguides, and at least one non-optically coupled waveguide structure is formed by a second one of said level one waveguides and a second one of said level two waveguides, wherein said at least one optically coupled waveguide structure is located adjacent to said at least one non-optically coupled waveguide structure.

5. The semiconductor structure of claim 4, wherein said optically coupled waveguide structure is optically isolated from said non-optically coupled waveguide structure.

6. The semiconductor structure of claim 4, wherein said plurality of fill shapes have different sizes.

* * * * *